(12) United States Patent
Pouhaer et al.

(10) Patent No.: US 11,861,991 B2
(45) Date of Patent: Jan. 2, 2024

(54) METHOD OF COMMUNICATION BETWEEN TWO SUB-SYSTEMS CONSTITUTING A MODULAR PAYMENT TERMINAL

(71) Applicant: Banks and Acquirers International Holding, Paris (FR)

(72) Inventors: Benoît Pouhaer, Antony (FR); Bernard Schang, Le Mesnil Saint Denis (FR); Dominique Cazou, Saint Jean d'Illac (FR); Christophe Auffray, Rueil Malmaison (FR)

(73) Assignee: BANKS AND ACQUIRERS INTERNATIONAL HOLDING, Paris (FR)

( * ) Notice: Subject to any disclaimer, the term of this patent is extended or adjusted under 35 U.S.C. 154(b) by 28 days.

(21) Appl. No.: 17/780,607

(22) PCT Filed: Nov. 25, 2020

(86) PCT No.: PCT/EP2020/083424
§ 371 (c)(1),
(2) Date: May 27, 2022

(87) PCT Pub. No.: WO2021/105245
PCT Pub. Date: Jun. 3, 2021

(65) Prior Publication Data
US 2022/0301383 A1    Sep. 22, 2022

(30) Foreign Application Priority Data
Nov. 29, 2019   (FR) ........................... 1913497

(51) Int. Cl.
*G06F 9/4401* (2018.01)
*G07F 7/08* (2006.01)
*G06Q 20/20* (2012.01)

(52) U.S. Cl.
CPC .......... *G07F 7/0873* (2013.01); *G06F 9/4418* (2013.01); *G06Q 20/204* (2013.01)

(58) Field of Classification Search
CPC .... G07F 7/0873; G07F 7/0886; G06F 9/4418; G06Q 20/204; G06Q 20/20
See application file for complete search history.

(56) References Cited

U.S. PATENT DOCUMENTS 9,350,799 B2 * 5/2016 Wang .................... H04L 65/612
10,120,427 B1 11/2018 Hebner et al.
(Continued)

FOREIGN PATENT DOCUMENTS

CA   2757952 A1 * 10/2010 ........... A61B 5/0031
CA   2990245 A1 *  6/2018 ............. G06K 19/02
(Continued)

OTHER PUBLICATIONS

CN 103853545A—A state switching method, a device and a first electronic device, 14 pages. (Year: 2023).*
(Continued)

*Primary Examiner* — Tuyen K Vo
(74) *Attorney, Agent, or Firm* — David D. Brush; Westman, Champlin & Koehler, P.A.

(57) ABSTRACT

A piece of electronic equipment including a first subsystem such as a touch-sensitive tablet and a second subsystem such as a payment terminal. The first sub-system embeds a first operating system for managing the power consumption of the first subsystem. The second subsystem embeds a specific and secure operating system capable of executing payment transactions. Since the two subsystems execute two different operating systems, an operating state of one of the subsystems may not allow the required service to be implemented if this requires the use of resources implemented by both of the two subsystems. Thus the first and second subsystems (Continued)

Figure 1:
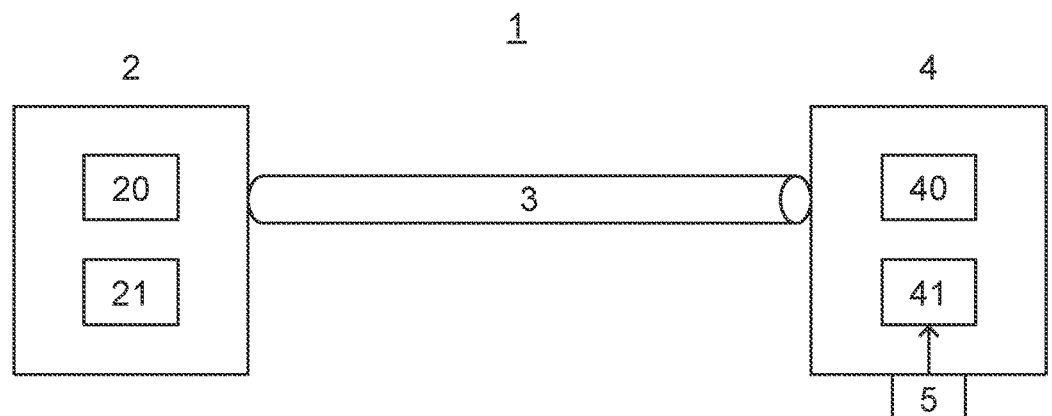

exchange data relating to their respective operating state and, where appropriate, change their current operating state as a function of the data relating to an operating state of the other subsystem thus exchanged.

12 Claims, 2 Drawing Sheets

(56) References Cited

U.S. PATENT DOCUMENTS

| | | | | |
|---|---|---|---|---|
| 11,170,372 | B2* | 11/2021 | Ezequiel | G06Q 20/325 |
| 2008/0122625 | A1* | 5/2008 | Jung | G06K 19/0705 |
| | | | | 340/572.1 |
| 2008/0136603 | A1* | 6/2008 | Choi | G06K 19/0723 |
| | | | | 340/10.33 |
| 2018/0005223 | A1 | 1/2018 | Terra et al. | |
| 2020/0410477 | A1* | 12/2020 | Terra | G06Q 20/341 |

FOREIGN PATENT DOCUMENTS

| | | | |
|---|---|---|---|
| CN | 103853545 A | * | 6/2014 |
| CN | 106446736 A | * | 2/2017 |

OTHER PUBLICATIONS

CN106446736A—An access method of register in RFID reader, 5 pages. (Year: 2023).*
English translation of the Written Opinion of the International Searching Authority dated Feb. 18, 2021 for corresponding International Application No. PCT/EP2020/083424, filed Nov. 25, 2020.
International Search Report dated Feb. 9, 2021 for corresponding International Application No. PCT/EP2020/083424, Nov. 25, 2020.
Written Opinion of the International Searching Authority dated Feb. 9, 2021 for corresponding International Application No. PCT/EP2020/083424, filed Nov. 25, 2020.
French Search Report and Written Opinion with English machine translation dated Aug. 13, 2020 for corresponding French Application No. 1913497, filed Nov. 29, 2019.

* cited by examiner

METHOD OF COMMUNICATION BETWEEN TWO SUB-SYSTEMS CONSTITUTING A MODULAR PAYMENT TERMINAL

CROSS-REFERENCE TO RELATED APPLICATIONS

This Application is a Section 371 National Stage Application of International Application No. PCT/EP2020/083424, filed Nov. 25, 2020, which is incorporated by reference in its entirety and published as WO 2021/105245 A1 on Jun. 3, 2021, not in English.

FIELD OF THE INVENTION

The field of the invention is that of modular terminals. More specifically, the invention relates to a method of communication between the component subsystems of a modular terminal, in particular a payment terminal.

PRIOR ART AND THE DRAWBACKS THEREOF

In the field of payment terminals in particular, a new generation of feature-rich modular terminals is emerging. Such terminals, referred to as smart terminals, can comprise a first set of components in particular comprising a processor and a memory, referred to as the first subsystem, for example in the form of a touch-sensitive tablet offering business services useful for managing a business, coupled with a second set of components (also comprising a processor and a memory which are independent from the first subsystem) referred to as the second subsystem, for example in the form of a payment terminal, accepting various means of payment.

The first subsystem, which is for example in the form of a tablet, embeds a first operating system, such as the Android™ operating system for example. Business applications, such as invoicing applications for example, can be quickly and easily integrated in order to enhance the retailer's experience. One of the functions of such an operating system is to manage the power consumption of the first subsystem. For example, the operating system of the first subsystem is designed to enter a so-called standby operating state when no interaction with a user interface of the first subsystem is detected after a determined period of time. In this standby state, some of the resources of this first subsystem can be made unavailable, thus helping to reduce power consumption.

The second subsystem, referred to as a payment subsystem, embeds a second specific and secure operating system capable of executing operations relating to secure transactions such as payment transactions. The operations implemented within the scope of the execution of secure transactions use and generate sensitive data (encryption keys, identifiers, biometric data and/or payment data); it is therefore important that these operations are executed with a high level of security.

For example, in the context of using a modular payment terminal, the tablet and the payment subsystem exchange data with one another in order to allow the services required for the business activity to be implemented (and in particular for the payments made by the customers).

However, since the two subsystems constituting the modular payment terminal execute two different operating systems, an operating state of one of the subsystems may not allow the required service to be implemented if this requires the use of resources implemented by both of the two subsystems.

For example, when the operating system of the tablet is in a standby state, some of the resources thereof are made unavailable and if the payment subsystem requires these resources to execute a service, the payment subsystem is unable to do so. Such a situation negatively impacts user experience, both for the retailer and for the customers, by prolonging or complicating the operations required to order and pay for products and/or services in the shop.

There is thus a need to provide a solution to improve the collaboration between the two subsystems constituting the payment terminal.

SUMMARY OF THE DISCLOSURE

The invention addresses this need by providing a method of communication between a first subsystem and at least one second subsystem, both integrated into a piece of electronic equipment, the first subsystem executing a first operating system and the second subsystem executing a second operating system, the method comprising the following steps, implemented by the first subsystem which is in a first operating state, of:
 detecting at least one event triggering a change in the operating state of said first subsystem to a second operating state,
 obtaining a datum representative of a current operating state of the second subsystem,
 when the current operating state of the second subsystem is different from the second operating state of the first subsystem, transmitting, to the second subsystem, a message comprising at least one command triggering a change in the operating state of said second subsystem to a new operating state similar to the second operating state of the first subsystem.

Such a solution allows each of the component subsystems of the modular electronic equipment to exchange data relating to their respective operating state and, where appropriate, to change their current operating state as a function of the data relating to an operating state of the other subsystem thus exchanged. The subsystems are integrated (or embedded) as a function of the arrangement of the electronic equipment, as explained hereinbelow: either high integration, in which the two subsystems are integrated within one and the same piece of electronic equipment, or low integration, in which the two subsystems are connected to one another, via a connecting device.

Thus, such a process ensures that the resources necessary to implement a service are available when the implementation of that service is required.

By ensuring that each of the component subsystems of the payment terminal adapts, where appropriate, its current operating state to that of the other subsystem, it can be guaranteed that the operations relating to payment transactions are always carried out with the required level of security, since the payment subsystem is in an operating state that matches the operating state of the tablet, for example.

Similarly, the present method allows the payment subsystem to take advantage of the tablet's ability to enter a so-called standby operating state, thereby helping to reduce the power consumption of the payment subsystem.

According to one feature of the method of the invention, when the current operating state of the second subsystem is similar to the second operating state of the first subsystem, the method comprises a step of transmitting, to the second subsystem, a message comprising a datum representative of the second operating state of the first subsystem.

Thus, the second subsystem is informed of the current state of the first subsystem.

According to another feature of the method of the invention, the method further comprises a step of receiving a message, transmitted by the second subsystem, comprising a datum representative of the new operating state of the second subsystem.

Thus, the first subsystem is informed of the current state of the second subsystem.

According to one embodiment of the method of the invention, the method further comprises a step of storing, in a memory register of the first subsystem, said datum representative of the second operating state of the first subsystem and said datum representative of the new current operating state of the second subsystem.

Thus, each subsystem maintains its current operating state as well as the last operating state of the other subsystem. This allows each subsystem to be able to adapt its operating state as a function of the current operating state of the other subsystem and the nature of the event detected without having to wait for a message to be received comprising a datum relating to the operating state of the other subsystem.

According to another embodiment, an operating state of the first subsystem and of the second subsystem belongs to a group comprising at least:

an awake state,
a standby state
a deep sleep state,
an inactive state,
an off state.

According to one specific feature of the method of the invention, when the first subsystem is a communication subsystem, the event triggering a change in the operating state of said first subsystem belongs to a group comprising:

detecting a battery level that is less than or equal to a first threshold,
detecting a strength of a radio signal allowing data to be transmitted to another piece of equipment that is less than or equal to a second threshold,
detecting an action carried out by means of a user interface of the first subsystem,
receiving a message from another piece of equipment,
receiving a message from the second subsystem,
expiry of a countdown.

According to yet another specific feature of the method of the invention, when the first subsystem is a payment terminal, the event triggering a change in the operating state of said first subsystem belongs to a group comprising:

detecting a battery level that is less than or equal to a first threshold,
receiving a message from the second subsystem, expiry of a countdown,
reading data from a payment device.

The invention further relates to a piece of electronic equipment comprising a first subsystem and at least one second subsystem, both integrated into a piece of electronic equipment, the first subsystem executing a first operating system and the second subsystem executing a second operating system, the first subsystem comprising:

means for detecting at least one event triggering a change in the operating state of said first subsystem to a second operating state,
means for obtaining a datum representative of a current operating state of the second subsystem,
when the current operating state of the second subsystem is different from the second operating state of the first subsystem, means for transmitting, to the second subsystem, a message comprising at least one command triggering a change in the operating state of said second subsystem to a new operating state similar to the second operating state of the first subsystem when it is executed by the second subsystem.

Such a piece of electronic equipment thus comprises two subsystems, which are in a way two more or less independent pieces of equipment that are integrated within the equipment. This integration can be very extensive: for example, the two subsystems can be integrated on the same motherboard of the electronic equipment, thus sharing the same platform. Conversely, the integration of the two subsystems can be lesser, for example by having an intermediate piece of connecting equipment between the two subsystems (for example connecting equipment for implementing the invention). In such a case, each subsystem is a module of the electronic equipment. What must be understood is that there are two subsystems, each executing a different operating system (OS), and that the technique allows each of the two subsystems to interact with the other, in particular by sharing their operating states.

Such a piece of electronic equipment is, in one specific embodiment, a modular payment terminal.

Such a modular payment terminal is composed of a subsystem acting as a communication terminal (and executing an Android™, iOS™ or other type of OS) and a subsystem acting as a payment terminal (and executing a secure, closed operating system).

According to one embodiment of the electronic equipment according to the invention, the first subsystem is a communication subsystem and the second subsystem is a payment terminal.

According to another embodiment of the electronic equipment according to the invention, the first subsystem is a payment terminal and the second subsystem is a communication subsystem.

Finally, the invention relates to a computer program product comprising program code instructions for implementing a method as described hereinabove, when it is executed by a processor.

The invention further relates to a computer-readable recording medium on which is recorded a computer program comprising program code instructions for executing the steps of the method according to the invention as described hereinabove.

Such a recording medium can be any entity or subsystem capable of storing the program. For example, the medium can include a storage means, such as a ROM, for example a CD-ROM or a microelectronic circuit ROM, or even a magnetic recording means, for example a USB stick or a hard drive.

On the other hand, such a recording medium can be a transmittable medium such as an electric or optical signal, which can be carried via an electric or optical cable, by radio, or by other means, such that the computer program contained therein can be executed remotely. The program according to the invention can in particular be downloaded from a network, for example the Internet network.

Alternatively, the recording medium can be an integrated circuit into which the program is incorporated, the circuit being suitable for executing or for use in the execution of the aforementioned method of the invention.

LIST OF FIGURES

Figure 2:
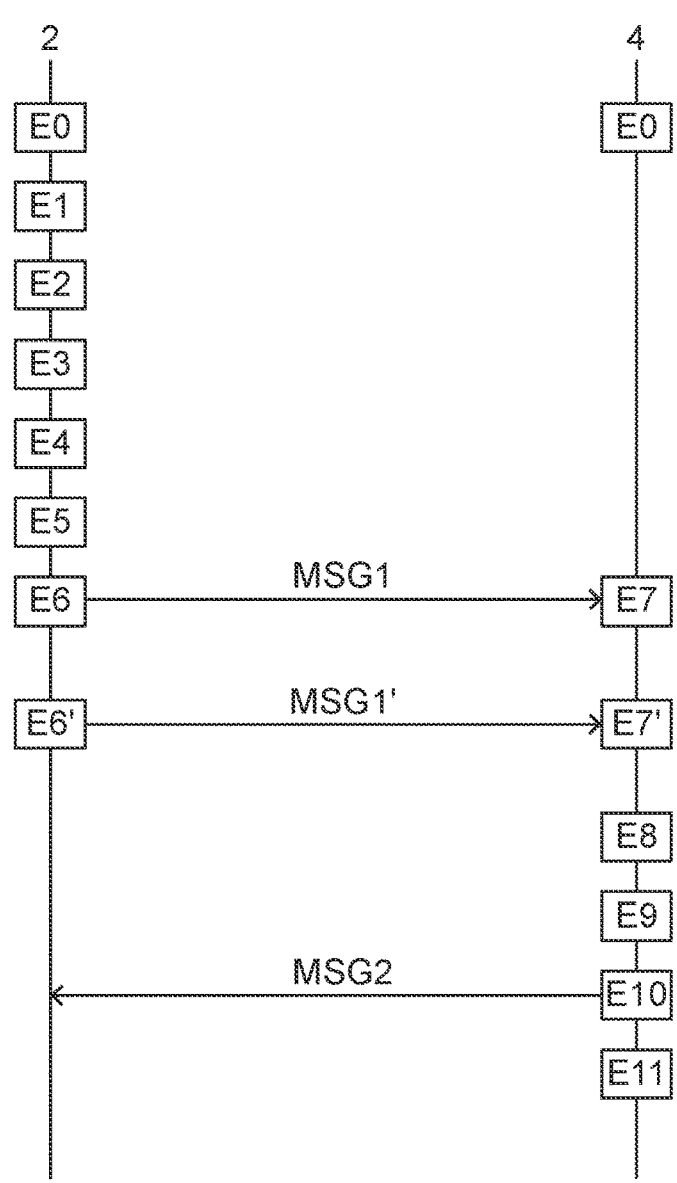
Figure 3:
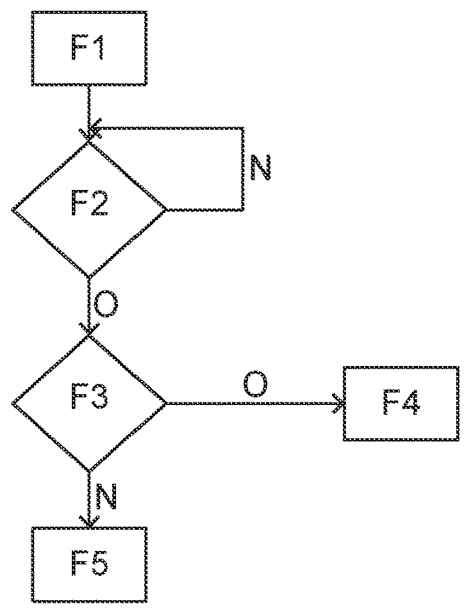
Figure 4:
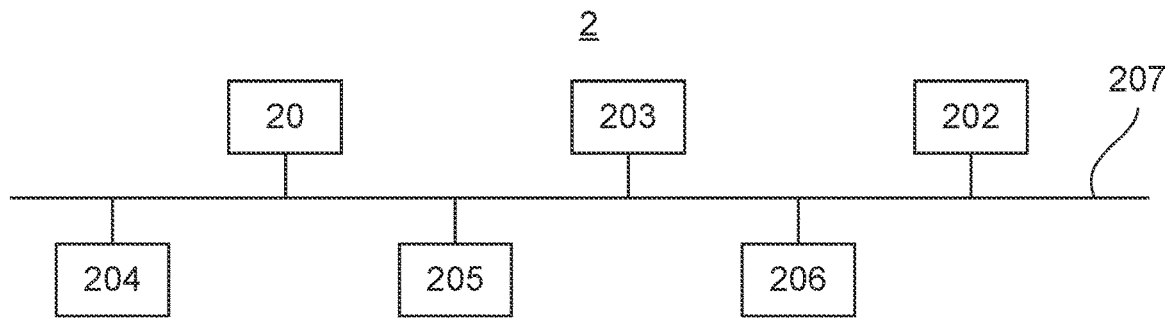
Figure 5:
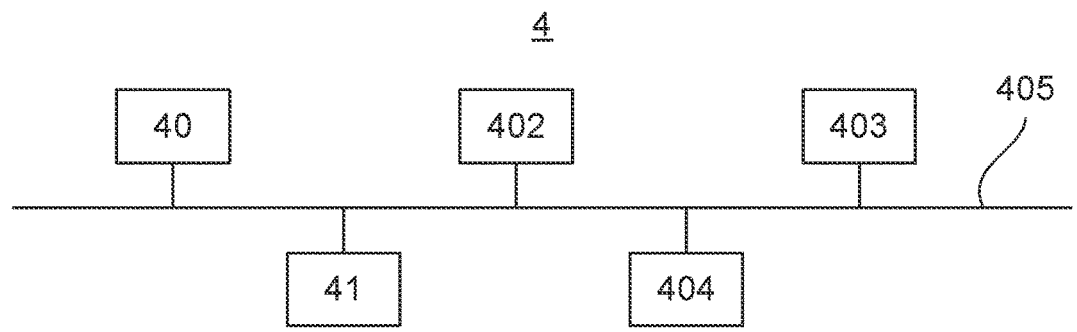

Other purposes, features and advantages of the invention will be better understood upon reading the following description, which is given as a rough guide and in no way as a limited guide, with reference to the accompanying figures, in which:

FIG. 1: this figure shows a modular payment terminal in which the present invention is implemented, FIG. 2: this figure shows a diagram of the different steps of a method of communication between a first component payment subsystem and a second component payment subsystem of the modular payment terminal, FIG. 3: this figure shows a method of powering on the modular payment terminal in which the present invention is implemented, FIG. 4: this figure shows the first subsystem of the modular payment terminal according to one embodiment of the invention, FIG. 5: this figure shows a payment subsystem of the modular payment terminal according to one embodiment of the invention.

DETAILED DESCRIPTION OF THE EMBODIMENTS OF THE INVENTION

The general principle of the invention is based on the knowledge, by each of the component subsystems of a modular payment terminal, of a current operating state of the other subsystem.

By ensuring that each of the component subsystems of the modular payment terminal, i.e. the tablet and the payment subsystem, adapts, where appropriate, its current operating state to that of the other subsystem, it can be guaranteed that the operations relating to payment transactions are always carried out with the required level of security, since the payment subsystem is in an operating state that matches the operating state of the tablet.

Similarly, such an approach allows the payment subsystem to take advantage of the tablet's ability to enter a so-called standby operating state, thereby helping to reduce the power consumption of the payment subsystem and thus the overall power consumption of the modular payment terminal.

FIG. 1 shows a modular payment terminal 1 in which the present invention is implemented.

Such a modular payment terminal comprises a first subsystem 2, such as a tablet or a smartphone, connected by means of a secure connection 3 to a second subsystem 4, referred to as the payment subsystem.

The payment subsystem 4 is capable of executing operations related to secure transactions such as payment transactions.

The first subsystem 2 in particular comprises a user interface 21 and a processor 20. The user interface 21 can, in one embodiment of the invention, consist of an alphanumeric keyboard and a screen. In another embodiment of the invention, the user interface 21 can be a touch screen. The subsystem 2 embeds a first operating system OS1, such as the Android™ operating system for example (the term 'embed' is understood to mean that an operating system OS1 runs in particular the subsystem, as is the case with operating systems).

The secure connection 3 can be a wired connection established using an Ethernet cable or even a wireless near-field connection of the Bluetooth® or NFC (Near Field Communication) type.

The payment subsystem 4 comprises a processor 40 and a payment card reader 41. In a first implementation, the payment card reader 41 is a secure contactless card reader using, for example, an NFC connection to exchange data with a payment card 5. When the payment card 5 is close enough to the contactless payment card reader, a secure near-field connection is established between the contactless payment card reader and the payment card 5.

In a second implementation, the payment card reader 41 is an integrated circuit card reader into which a payment card 5 is inserted. Once the payment card 5 has been inserted into the integrated circuit card reader, a connection is established between the payment card 5 and the reader heads of the integrated circuit card reader allowing data to be exchanged between the integrated circuit card reader and the payment card 5. A third implementation comprises all of the aforementioned techniques, i.e. a contact reader (chip, strip reader) and a contactless reader.

The payment subsystem 4 embeds a second specific and secure operating system OS2 capable of executing the operations relating to secure transactions such as payment transactions.

Finally, the subsystem 2 and the payment subsystem 4 each comprise a database (for example a memory register), BD2 and BD4 respectively.

The subsystem 2 and the payment subsystem 4 can be in different operating states, including:
- an awake state,
- a standby state,
- a deep sleep state,
- an inactive state,
- an off state.

FIG. 2 shows a diagram of the different steps of a method of communication between the first subsystem 2 and the payment subsystem 4 of the modular payment terminal 1. In the remainder of the present document, the communication method of the invention is considered to have been initiated by the subsystem 2. However, the communication method of the invention can also be initiated, in a similar manner, by the payment subsystem 4.

In a step E0, the subsystem 2 stores, in the database BD2, a first operating state $EF_4 1$ of the payment subsystem 4. In the same step E0, the payment subsystem 4 stores, in the database BD4, a first operating state $EF_2 1$ of the subsystem 2.

In a step E1, the subsystem 2 detects at least one event EVT1 triggering a change in the operating state of the subsystem 2 from the first operating state $EF_2 1$ to a second operating state $EF_2 2$.

Such an event EVT1 can, for example, be:
- the detection of a battery level of the subsystem 2 that is less than or equal to a first threshold,
- the detection of a strength of a radio signal allowing data to be transmitted from the subsystem 2 to another piece of equipment that is less than or equal to a second threshold,
- the detection of an action carried out by means of the user interface 20 of the subsystem 2,
- the receipt of a message from another piece of equipment,
- the receipt of a message from the payment subsystem 4,
- the expiry of a countdown.

A message, according to the invention, can be a conventional message comprising a datum or a command, transmitted according to a suitable message transmission protocol; a message can also be in the form of a signal transmitted directly to a microprocessor or a register, that is for example binary, ternary or quaternary, which can change state on receipt of this signal, the change in state triggering, for example, the implementation of a pre-determined command at the receiver of this signal.

When the communication method is implemented by the payment subsystem 4, the event EVT1 can also be the reading of data stored in a payment card.

In a step E2, the subsystem 2 determines whether its current operating state $EF_21$ must be changed as a result of the detection of the event EVT1. If there is no need to change the operating state $EF_21$ following the detection of the event EVT1, then subsystem 2 directly executes step E4.

If there is a need to change the operating state $EF_21$ following the detection of the event EVT1, then the subsystem 2 executes step E3. During this step E3, a change in the operating state of the subsystem 2 from the first operating state $EF_21$ to a second operating state $EF_22$ is implemented.

Thus, for example, the first subsystem 2 is in a first operating state $EF_21$, such as a standby state. In step E1, the subsystem 2 detects an action carried out by means of the user interface 20, such as a short press on a standby button of the modular payment terminal 1. In step E2, the subsystem 2 determines that there is a need to change the operating state $EF_21$ as a result of the detection of the event EVT1. Thus, in step E3, the subsystem 2 switches from its first operating state $EF_21$, which is a standby state, to a second operating state $EF_22$, which is an awake state, in which all of the resources of the first subsystem 2 are available.

When the subsystem 2 has switched to the operating state $EF_22$, the database BD2 is updated, in step E4, and the current operating state $EF_22$ is stored in memory in replacement of the former operating state $EF_21$.

In a step E5, the subsystem 2 obtains a datum representative of a current operating state $EF_41$ of the payment subsystem 4. Such a datum representative of the current operating state $EF_41$ of the payment subsystem 4 is, for example, stored in the database BD2.

When the current operating state $EF_41$ of the payment subsystem 4 is similar to the second operating state $EF_22$, the subsystem 2 transmits, to the payment subsystem 4, a message MSG1 comprising a datum representative of the second operating state $EF_22$ of the subsystem 2 in a step E6.

In a step E7, upon receiving the message MSG1, the payment subsystem 4 updates its database BD4 with the datum representative of the second operating state $EF_22$ of the subsystem 2.

When the current operating state $EF_41$ of the payment subsystem 4 is not similar to the second operating state $EF_22$, the subsystem 2 transmits, in a step E6', to the payment subsystem 4, a message MSG1' comprising at least one command triggering a change in the operating state of the payment subsystem 4 to a new operating state $EF_42$ similar to the second operating state $EF_22$ of the subsystem 2 when it is executed by the second payment subsystem 4.

In one specific embodiment of the method of the invention, the message MSG1' further comprises a datum representative of the second operating state $EF_22$ of the subsystem 2. Then, in a step E7', upon receiving the message MSG1', the payment subsystem 4 updates its database BD4 with the datum representative of the second operating state $EF_22$ of the subsystem 2. In a step E8, following receipt of the message MSG1', the payment subsystem 4 executes the change state command and switches from its current operating state $EF_41$ to a new operating state $EF_42$ similar to the operating state $EF_22$ of the subsystem 2.

In a step E9, the payment subsystem 4 updates its database BD4 with a datum representative of its new current operating state $EF_42$.

In a step E10, the payment subsystem 4 transmits a message MSG2 to the subsystem 2 comprising a datum representative of the new operating state of the second subsystem $EF_42$.

In a step E11, the subsystem 2 updates its database BD2 with the datum representative of the new current operating state $EF_42$ of the payment subsystem 4.

At the end of step E11, both the subsystem 2 and the payment subsystem 4 are in a similar operating state.

Thus, in a first example, the subsystem 2 is in a current operating state $EF_21$ such as an awake state. The payment subsystem 4 is in a current operating state $EF_41$ which is also an awake state. The subsystem 2 then detects the expiry of a countdown, for example one minute has elapsed since the detection of a last action carried out by means of the user interface 20 or since messages were last exchanged between the subsystem 2 and the payment subsystem 4. The subsystem 2 thus determines that its current operating state $EF_21$ must be changed due to the expiry of the countdown. The subsystem 2 thus switches from the operating state $EF_21$ to a new current operating state $EF_22$, which is a standby state in which some of the resources of the first subsystem 2 are made unavailable.

The database BD2 of the subsystem 2 is updated and the new current operating state $EF_22$ is thus stored in memory in replacement of the former operating state $EF_21$. The subsystem 2 also obtains a datum representative of the current operating state $EF_41$ of the payment subsystem 4 by querying the database BD2. The subsystem 2 thus determines that the current operating state $EF_41$ is not similar to its new current operating state $EF_22$ since the payment subsystem 4 is in an awake state whereas the subsystem 2 is in a standby state.

The subsystem 2 thus issues the message MSG1' comprising at least one command triggering a change in the operating state of the payment subsystem 4 to a new operating state $EF_42$ which is also a standby state.

Upon receipt of the message MSG1', the payment subsystem 4 executes the change operating state command and enters the standby state. Thus, the payment subsystem 4 takes advantage of the ability of the subsystem 2 to enter a standby state helping to reduce the power consumption of the payment subsystem and thus of the modular payment terminal 1.

In a second example, the subsystem 2 is in a current operating state $EF_21$ such as a standby state. The payment subsystem 4 is in a current operating state $EF_41$ which is also a standby state. The payment card reader 41 of the payment subsystem 4 detects a payment card 5. The payment subsystem 4 thus determines that its current operating state $EF_41$ must be changed as a result of the detection of the payment card 5. The payment subsystem 4 thus switches from the operating state $EF_41$ to a new current operating state $EF_42$, which is an awake state.

The database BD4 of the payment subsystem 4 is updated and the new current operating state $EF_42$ is thus stored in memory in replacement of the former operating state $EF_41$. The payment subsystem 4 also obtains a datum representative of the current operating state $EF_21$ of the subsystem 2 by querying the database BD4. The payment subsystem 4 thus determines that the current operating state $EF_21$ of the subsystem 2 is not similar to its new current operating state $EF_42$ since the subsystem 2 is in a standby state whereas the payment subsystem 4 is in an awake state.

The payment subsystem 4 thus issues a message comprising at least one command triggering a change in the operating state of the subsystem 2 to a new operating state EF$_2$2 which is also an awake state.

Upon receipt of the message, the subsystem 2 executes the change operating state command and enters the awake state. Thus, all of the resources of the first subsystem 2 are made available and can thus contribute to implementing the payment transaction taking place in the payment subsystem 4.

FIG. 3 shows a method for powering on the modular payment terminal 1. Such a power-on method is implemented by the subsystem 2.

In a step F1, the modular payment terminal is powered off. In other words, the subsystem 2 and the payment subsystem 4 are powered off.

In a step F2, a first action A1 carried out by means of the user interface 21 of the subsystem 2 is detected. Such an action A1 is, for example, a pressing of a power-on button for a duration exceeding a first threshold S1.

When the power-on button is pressed for a duration exceeding the first threshold S1, the modular payment terminal 1 is powered on. In other words, the subsystem 2 and the payment subsystem 4 are powered on. The modular payment terminal 1 is thus functional and the subsystem 2 and the payment subsystem 4 can in particular implement the communication method described with reference to [FIG. 2].

In a step F3, the subsystem 2 detects a second action A2 carried out by means of the user interface 21. Such an action A2 is, for example, a pressing of a power-on button for a duration exceeding a first threshold S2, which is different from the first threshold S1.

In a step F4, when the power-on button is pressed for a duration exceeding the second threshold S2, a menu is displayed via the user interface 21 proposing several actions: powering off the subsystem 2, powering off the payment subsystem 4, restarting the operating system OS2 of the subsystem 2.

In a step F5, when the power-on button is pressed for a duration that is less than the second threshold S2, the modular payment terminal 1 is placed on standby. In other words, the subsystem 2 and the payment subsystem 4 are placed on standby.

FIG. 4 shows the subsystem 2 according to one embodiment of the invention.

The subsystem 2 can comprise at least one hardware processor 20, a storage unit 202, an input device 203, a display device 204, an interface 205, and at least one network interface 206 which are connected to one another via a bus 207. It goes without saying that the component elements of the subsystem 2 can be connected by means of a connection that is different from a bus.

The processor 20 controls the operations of the subsystem 2. The storage unit 202 stores at least one program for implementing a communication method and powering-on method according to one embodiment of the invention to be executed by the processor 20, and various data, such as parameters used for computations carried out by the processor 20, and intermediate data for computations carried out by the processor 20, etc. The processor 20 can be formed by any known and suitable hardware or software, or by a combination of hardware and software. For example, the processor 20 can be formed by dedicated hardware such as a processing circuit, or by a programmable processing unit such as a central processing unit that executes a program stored in a memory thereof.

The storage unit 202 can be formed by any suitable means capable of storing the one or more programs and data in a computer-readable manner. Examples of a storage unit 202 include computer-readable non-transitory storage media such as solid-state memory devices and magnetic, optical or magneto-optical recording media loaded on a read/write unit.

The entry device 203 can be formed by a keyboard, or a pointing device such as a mouse to be used by a user to enter commands. The display device 204 can also be formed by a display module, such as a graphical user interface or GUI. The entry device 203 and the display device 204 constitute the user interface 20 and can be integrally formed by a touch screen, for example.

The interface 205 provides an interface between the subsystem 2 and the payment subsystem 4. The interface 205 can communicate with the payment subsystem 4 via a wired or wireless connection.

At least one network interface 206 provides a connection between the subsystem 2 and a remote piece of equipment via a communication network, such as the Internet. The network interface 206 can provide, depending on the nature thereof, a wired or wireless connection to the network.

FIG. 5 shows a payment subsystem 4 according to one embodiment of the invention.

The payment subsystem 4 can comprise at least a hardware processor 40, a storage unit 402, a secure data processing module 403, a reading module 41 for reading a payment card 5, and an interface 404 which are connected to one another via a bus 405. It goes without saying that the component elements of the payment subsystem 4 can be connected by means of a connection that is different from a bus.

The processor 40 controls the operations of the payment subsystem 4. The storage unit 402 stores at least one program for implementing a communication method according to one embodiment of the invention to be executed by the processor 40, and various data, such as parameters used for computations carried out by the processor 40, and intermediate data for computations carried out by the processor 40, etc. The processor 40 can be formed by any known and suitable hardware or software, or by a combination of hardware and software. For example, the processor 40 can be formed by dedicated hardware such as a processing circuit, or by a programmable processing unit such as a central processing unit that executes a program stored in a memory thereof.

The storage unit 402 can be formed by any suitable means capable of storing the one or more programs and data in a computer-readable manner. Examples of a storage unit 402 include computer-readable non-transitory storage media such as solid-state memory devices and magnetic, optical or magneto-optical recording media loaded on a read/write unit.

The interface 404 provides an interface between the payment subsystem 4 and the subsystem 2. The interface 404 can communicate with the subsystem 2 via a wired or wireless connection.

The secure data processing module 403 is controlled by the processor 40. The secure data processing module 20 can be a software module or a combination of hardware and software.

The invention claimed is:

1. A communication method of communication between a first subsystem and at least one second subsystem embedded into a piece of electronic equipment, the first subsystem executing a first operating system and the second subsystem executing a second operating system, the method comprising the following acts, implemented by the first subsystem which is in a first operating state:

detecting at least one event triggering a change in an operating state of said first subsystem from the first operating state to a second operating state, obtaining a datum representative of a current operating state of the second subsystem, and in response to the current operating state of the second subsystem being different from the second operating state of the first subsystem, transmitting, to the second subsystem, a message comprising at least one command triggering a change in said second subsystem from the current operating state to a new operating state similar to the second operating state of the first subsystem when the at least one command is executed by the second subsystem.

2. The communication method according to claim 1, comprising:

when the current operating state of the second subsystem is similar to the second operating state of the first subsystem, transmitting, to the second subsystem, a message comprising a datum representative of the second operating state of the first subsystem.

3. The communication method according to claim 1, wherein the message further comprises a datum representative of the second operating state of the first subsystem.

4. The communication method according to claim 1, further comprising receiving a message, transmitted by the second subsystem, comprising a datum representative of the new operating state of the second subsystem.

5. The communication method according to claim 1, further comprising storing, in a memory register of the first subsystem, said datum representative of the second operating state of the first subsystem and said datum representative of the new current operating state of the second subsystem.

6. The communication method according to claim 1, wherein the first and second operating states of the first subsystem and the current and new operating states of the second subsystem belong to a group consisting of:

an awake state,
a standby state,
a deep sleep state,
an inactive state,
an off state.

7. The communication method according to claim 1 wherein, the first subsystem is a communication subsystem, and the event triggering the change in the operating state of said first subsystem belongs to a group consisting of:

detection of a battery level that is less than or equal to a first threshold,
detection of a strength of a radio signal allowing data to be transmitted to another piece of equipment that is less than or equal to a second threshold,
detection of an action carried out by means of a user interface of the first subsystem,
receipt of a message from another piece of equipment,
receipt of a message from the second subsystem,
expiry of a countdown.

8. The communication method according to claim 1 wherein, the first subsystem is a payment terminal, and the event triggering the change in the operating state of said first subsystem belongs to a group consisting of:

detection of a battery level that is less than or equal to a first threshold,
receipt of a message from the second subsystem,
expiry of a countdown,
reading of data stored in a payment card.

9. A piece of electronic comprising integrated therein a first subsystem and at least one second subsystem, the first subsystem executing a first operating system and the second subsystem executing a second operating system, the first subsystem comprising:

a processor; and
a non-transitory computer readable medium comprising instructions stored thereon which when executed by the processor configure the first subsystem to:

detect at least one event triggering a change in an operating state of said first subsystem from a first operating state to a second operating state, obtain a datum representative of a current operating state of the second subsystem, and in response to the current operating state of the second subsystem being different from the second operating state of the first subsystem, transmitting, to the second subsystem, a message comprising at least one command triggering a change in of said second subsystem from the current operating state to a new operating state similar to the second operating state of the first subsystem when the at least one command is executed by the second subsystem.

10. The piece of electronic according to claim 9, wherein the first subsystem is a communication subsystem and the second subsystem is a payment terminal.

11. The piece of electronic according to claim 9, wherein the first subsystem is a payment terminal and the second subsystem is a communication subsystem.

12. A non-transitory computer-readable medium comprising a computer program product stored thereon comprising program code instructions for implementing a communication method between a first subsystem and at least one second subsystem, when the instructions are executed by a processor of the first subsystem, the first subsystem and the at least one second subsystem being embedded into a piece of electronic equipment, the first subsystem executing a first operating system and the second subsystem executing a second operating system, the method comprising:

detecting at least one event triggering a change in an operating state of said first subsystem from a first operating state to a second operating state, obtaining a datum representative of a current operating state of the second subsystem, and in response to the current operating state of the second subsystem being different from the second operating state of the first subsystem, transmitting, to the second subsystem, a message comprising at least one command triggering a change in said second subsystem from the current operating state to a new operating state similar to the second operating state of the first subsystem the at least one command is executed by the second subsystem.

* * * * *